(12) United States Patent
Zhang et al.

(10) Patent No.: US 10,675,204 B2
(45) Date of Patent: Jun. 9, 2020

(54) POWERED EXOSKELETON AND STABILIZING STRUCTURE THEREOF

(71) Applicant: BOE TECHNOLOGY GROUP CO., LTD., Beijing (CN)

(72) Inventors: Ying Zhang, Beijing (CN); Yifei Zhang, Beijing (CN); Kai Zhao, Beijing (CN); Yu Gu, Beijing (CN); Hongli Ding, Beijing (CN)

(73) Assignee: BOE TECHNOLOGY GROUP CO., LTD, Beijing (CN)

(*) Notice: Subject to any disclaimer, the term of this patent is extended or adjusted under 35 U.S.C. 154(b) by 317 days.

(21) Appl. No.: 15/798,505

(22) Filed: Oct. 31, 2017

(65) Prior Publication Data

US 2018/0256435 A1  Sep. 13, 2018

(30) Foreign Application Priority Data

Mar. 9, 2017  (CN) .......................... 2017 1 0138833

(51) Int. Cl.
*A61H 3/00* (2006.01)
*A61H 1/02* (2006.01)
*B25J 9/00* (2006.01)

(52) U.S. Cl.
CPC ................. *A61H 3/00* (2013.01); *A61H 1/02* (2013.01); *B25J 9/0006* (2013.01); *A61H 2201/0119* (2013.01); *A61H 2201/0165* (2013.01); *A61H 2201/0173* (2013.01); *A61H 2201/0192* (2013.01); *A61H 2201/0196* (2013.01); *A61H 2201/12* (2013.01); *A61H 2201/123* (2013.01); *A61H 2201/1246* (2013.01); *A61H 2201/1463* (2013.01); *A61H 2201/164* (2013.01); *A61H 2201/165* (2013.01); *A61H 2201/1671* (2013.01); *A61H 2201/1676* (2013.01); *A61H 2201/5007* (2013.01);

(Continued)

(58) Field of Classification Search
CPC .................................. A61H 3/00; B25J 9/0006
See application file for complete search history.

(56) References Cited

U.S. PATENT DOCUMENTS 5,358,265 A * 10/1994 Yaple ....................... B62H 1/02
                                                                280/293
7,287,774 B2 * 10/2007 Mullins .................... B62H 1/12
                                                                180/219

FOREIGN PATENT DOCUMENTS

CN    201759145 U    3/2011
CN    102616535 A    8/2012

(Continued)

OTHER PUBLICATIONS

First Office Action for Chinese Application No. 201710138833.8, dated Jan. 29, 2019, 8 Pages.

*Primary Examiner* — Brian A Dukert
*Assistant Examiner* — Amanda M Barkan
(74) *Attorney, Agent, or Firm* — Brooks Kushman P.C.

(57) ABSTRACT

The present disclosure relates to a powered exoskeleton. The powered exoskeleton includes a leg connection rod and a stabilizing structure. The stabilizing structure is mounted on the leg connection rod. The stabilizing structure is switched between a folded state and an unfolded state in such a manner that the stabilizing structure is folded on the leg connection rod when the stabilizing structure is in the folded state, and the stabilizing structure is suitable for being in contact with the ground and supports the leg connection rod in a tilted upward direction when the stabilizing structure is in the unfolded state.

11 Claims, 6 Drawing Sheets

(52) U.S. Cl.
CPC ............... *A61H 2201/5061* (2013.01); *A61H 2201/5071* (2013.01); *A61H 2230/00* (2013.01)

(56) References Cited

FOREIGN PATENT DOCUMENTS

| CN | 105213155 A | 1/2016 |
| CN | 105640743 A | 6/2016 |
| FR | 2941619 A1 | 8/2010 |
| KR | 101274895 B1 | 6/2013 |

\* cited by examiner

POWERED EXOSKELETON AND STABILIZING STRUCTURE THEREOF

CROSS-REFERENCE TO RELATED APPLICATION

This application claims priority to Chinese Patent Application No. 201710138833.8 filed on Mar. 9, 2017, which is incorporated herein by reference in its entirety.

TECHNICAL FIELD

The present disclosure relates to the field of wearable skeletal frameworks, and in particular to a powered exoskeleton and a stabilizing structure thereof.

BACKGROUND

A powered exoskeleton is a skeletal framework that is worn on an outside of the human body, and is driven by a series of motors or a hydraulic pressure system, to extend or enhance one's physiological function (mainly the ability of limbs to exercise, such as strength and endurance). The powered exoskeleton has two major applications: one is military application in which the powered exoskeleton is worn on a soldier to enable the soldier to be able to carry heavier weapons as well as to enable the soldier to be able to walk with load for a long time, thereby improving the soldier's combat capability, and the other one is civil application in which the powered exoskeleton is worn on the disabled or the elderly to help them to have normal or even extraordinary physiological function, particularly the ability to walk.

SUMMARY

One embodiment of the present disclosure provides a powered exoskeleton, which has a good stability.

One embodiment of the present disclosure further provides a stabilizing structure applied to the powered exoskeleton.

One embodiment of the present disclosure provides a powered exoskeleton, which includes a leg connection rod and a stabilizing structure. The stabilizing structure is mounted on the leg connection rod. The stabilizing structure is switched between a folded state and an unfolded state in such a manner that the stabilizing structure is folded on the leg connection rod when the stabilizing structure is in the folded state, and the stabilizing structure is suitable for being in contact with the ground and supports the leg connection rod in a tilted upward direction when the stabilizing structure is in the unfolded state.

According to the powered exoskeleton, when it is necessary to stabilize the powered exoskeleton, the stabilizing structure is unfolded, thereby stabilizing the powered exoskeleton by means of the stabilizing structure.

Further, the stabilizing structure includes: a contact member configured to be in contact with the ground when the stabilizing structure is in the unfolded state; and a first supporting rod with one end connected with the leg connection rod and another end connected with the contact member. The first supporting rod is configured to drive the contact member to contact with or move away from the ground.

Further, the first supporting rod is a retractable rod.

Further, the first supporting rod is rotatablely connected with the leg connection rod.

Further, the stabilizing structure further includes a driving member configured to drive the retractable rod to elongate or retract; the driving member is disposed on the leg connection rod and is connected with the retractable rod.

Further, the stabilizing structure further includes a second supporting rod; the one end of the first supporting rod is rotatablely connected with the leg connection rod, and one end of the second supporting rod is rotatablely connected with the leg connection rod; a portion where the second supporting rod is connected with the leg connection rod is spaced from a portion where the first supporting rod is connected with the leg connection rod; and another end of the second supporting rod is rotatablely connected with the contact member; at least one of the first supporting rod and the second supporting rod is a retractable rod.

Further, the stabilizing structure is constructed in such a manner that when the stabilizing structure is in the unfolded state, the other end of the first supporting rod where the first supporting rod is connected with the contact member and the other end of the second supporting rod where the second supporting rod is connected with the contact member are oriented downwardly, and when the stabilizing structure is in the folded state, the other end of the first supporting rod where the first supporting rod is connected with the contact member and the another end of the second supporting rod where the second supporting rod is connected with the contact member are oriented upwardly.

Further, the stabilizing structure further includes a driving member configured to drive the retractable rod to elongate or retract; the driving member is disposed on the leg connection rod and is connected with the retractable rod.

Further, the retractable rod includes: a primary rod group which includes one primary connection rod or several primary connection rods which are sequentially connected in a hinged manner; and a secondary rod group which includes one secondary connection rod or several secondary connection rods which are sequentially connected in a hinged manner. The primary connection rod is corresponding to the secondary connection rod in a one-to-one manner, and each primary connection rod and the corresponding secondary connection rod cross and are hinged to each other. One end of the primary rod group is rotatablely connected with the driving member, and another end of the primary rod group is rotatablely connected with the contact member. One end of the secondary rod group is rotatablely connected with the driving member, and the other end of the secondary rod group is rotatablely connected with the contact member.

Further, the driving member includes a main portion and a retractable shaft which is disposed in the main portion and is configured to elongate or retract with respect to the main portion. One end of the primary rod group is rotatablely connected with the main portion, and a position of the one end of the primary rod group with respect to the main portion in an axial direction of the retractable shaft is fixed. One end of the secondary rod group is rotatablely connected with the retractable shaft, and a position of the one end of the secondary rod group with respect to the retractable shaft in the axial direction of the retractable shaft is fixed.

Further, the main portion is connected with a primary connection member which is able to rotate around an axis of the retractable shaft; the one end of the primary rod group is hinged to the primary connection member; and a rotation axis around which the one end of the primary rod group rotates relative to the primary connection member, is perpendicular to the axis of the retractable shaft; and a free end of the retractable shaft is connected with a secondary connection member which is able to rotate around the axis of the retractable shaft; the one end of the secondary rod group is hinged to the secondary connection member; and a rotation axis around which the one end of the secondary rod group rotates relative to the secondary connection member, is perpendicular to the axis of the retractable shaft.

Further, the contact member includes a connection shaft and at least one wheel connected with the connection shaft.

One embodiment of the present disclosure further provides a stabilizing structure applied to a powered exoskeleton, including a contact member suitable for being in contact with the ground and a first supporting rod. The first supporting rod is connected with the contact member; the first supporting rod is configured to drive the contact member to being folded or unfolded.

Further, the first supporting rod is a retractable rod; the stabilizing structure further includes a driving member, the driving member is connected with the retractable rod and is configured to drive the retractable rod to elongate or retract.

Further, the stabilizing structure further includes a second supporting rod. The second supporting rod is connected with the contact member, and at least one of the first supporting rod and the second supporting rod is a retractable rod. The stabilizing structure further includes a driving member, the driving member is connected with the retractable rod and is configured to drive the retractable rod to elongate or retract.

Further, the retractable rod includes: a primary rod group which includes one primary connection rod or several primary connection rods which are sequentially connected in a hinged manner; and a secondary rod group which includes one secondary connection rod or several secondary connection rods which are sequentially connected in a hinged manner. The primary connection rod is corresponding to the secondary connection rod in a one-to-one manner, and each primary connection rod and the corresponding secondary connection rod cross and are hinged to each other. An end of the primary rod group is rotatablely connected with the driving member, and another end of the primary rod group is rotatablely connected with the contact member; and an end of the secondary rod group is rotatablely connected with the driving member, and another end of the secondary rod group is rotatablely connected with the contact member.

Further, the driving member includes a main portion and a retractable shaft which is disposed in the main portion and is configured to elongate or retract with respect to the main portion. One end of the primary rod group is rotatablely connected with the main portion, and a position of the one end of the primary rod group with respect to the main portion in an axial direction of the retractable shaft is fixed; and one end of the secondary rod group is rotatablely connected with the retractable shaft, and a position of the one end of the secondary rod group with respect to the retractable shaft in the axial direction of the retractable shaft is fixed.

Further, the main portion is connected with a primary connection member which is able to rotate around an axis of the retractable shaft; the one end of the primary rod group is hinged to the primary connection member; and a rotation axis around which the one end of the primary rod group rotates relative to the primary connection member, is perpendicular to the axis of the retractable shaft; and a free end of the retractable shaft is connected with a secondary connection member which is able to rotate around the axis of the retractable shaft; the one end of the secondary rod group is hinged to the secondary connection member; and a rotation axis around which the one end of the secondary rod group rotates relative to the secondary connection member, is perpendicular to the axis of the retractable shaft.

Further, the driving member is a cylinder.

Further, the contact member includes a connection shaft and at least one wheel connected with the connection shaft.

BRIEF DESCRIPTION OF THE DRAWINGS

The accompanying drawings, which are incorporated in and constitute a part of this specification, illustrate embodiments consistent with the disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of devices and methods consistent with aspects related to the disclosure as recited in the appended claims.

A powered exoskeleton is a skeletal framework that is worn on an outside of the human body, and is driven by a series of motors or a hydraulic pressure system, to extend or enhance one's physiological function (mainly the ability of limbs to exercise, such as strength and endurance). The powered exoskeleton has two major applications: one is military application in which the powered exoskeleton is worn on a soldier to enable the soldier to be able to carry heavier weapons as well as to enable the soldier to be able to walk with load for a long time, thereby improving the soldier's combat capability, and the other one is civil application in which the powered exoskeleton is worn on the disabled or the elderly to help them to have normal or even extraordinary physiological function, particularly the ability to walk.

During utilization of the powered exoskeleton, instability may occur. In order to overcome this issue, the present disclosure provides a powered exoskeleton and a stabilizing structure thereof, which can improve the stability of the powered exoskeleton.

The powered exoskeleton and the stabilizing structure of embodiments of the present disclosure are described hereinafter in conjunction with the drawings.

As shown in FIG. 1 to FIG. 4, a powered exoskeleton 100 of one embodiments of the present disclosure includes a leg connection rod 1 and a stabilizing structure 2. The leg connection rod 1 may be mounted to a leg M, and the stabilizing structure 2 is mounted on the leg connection rod 1 to stabilize the powered exoskeleton 100.

Figure 1:
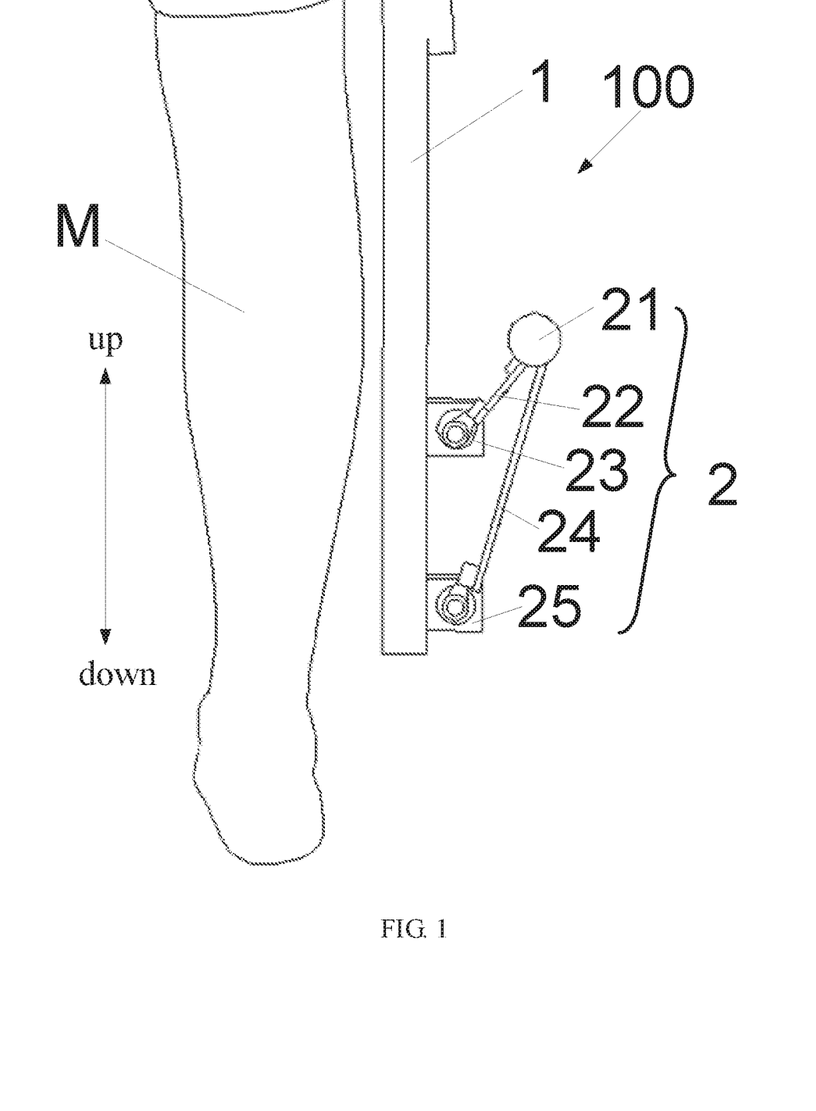
FIG. 1 is a front view of a powered exoskeleton when the powered exoskeleton is folded according to an embodiment of the present disclosure.
Figure 2:
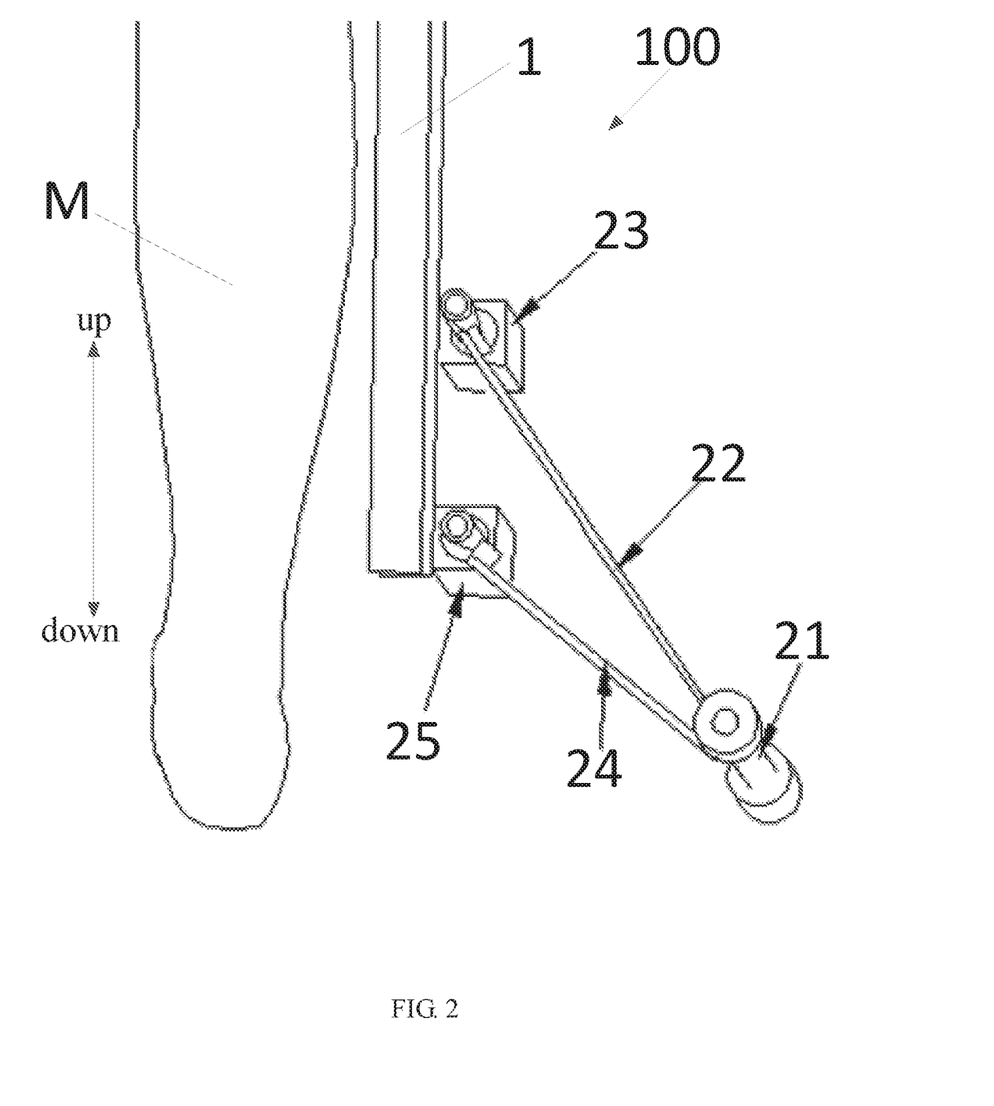
FIG. 2 is a front view of the powered exoskeleton shown in FIG. 1 when the powered exoskeleton is unfolded.
Figure 3:
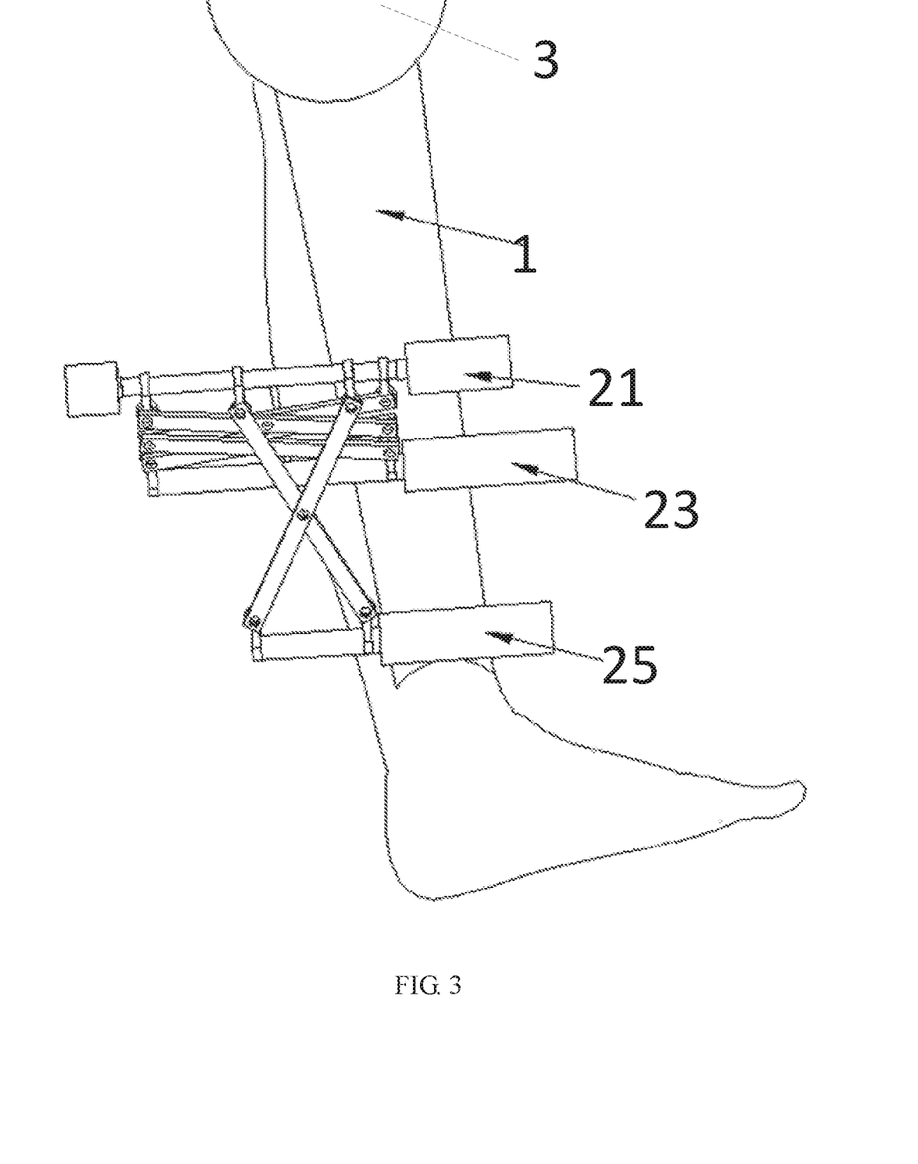
FIG. 3 is a side view of a powered exoskeleton when the powered exoskeleton is folded according to an embodiment of the present disclosure.
Figure 4:
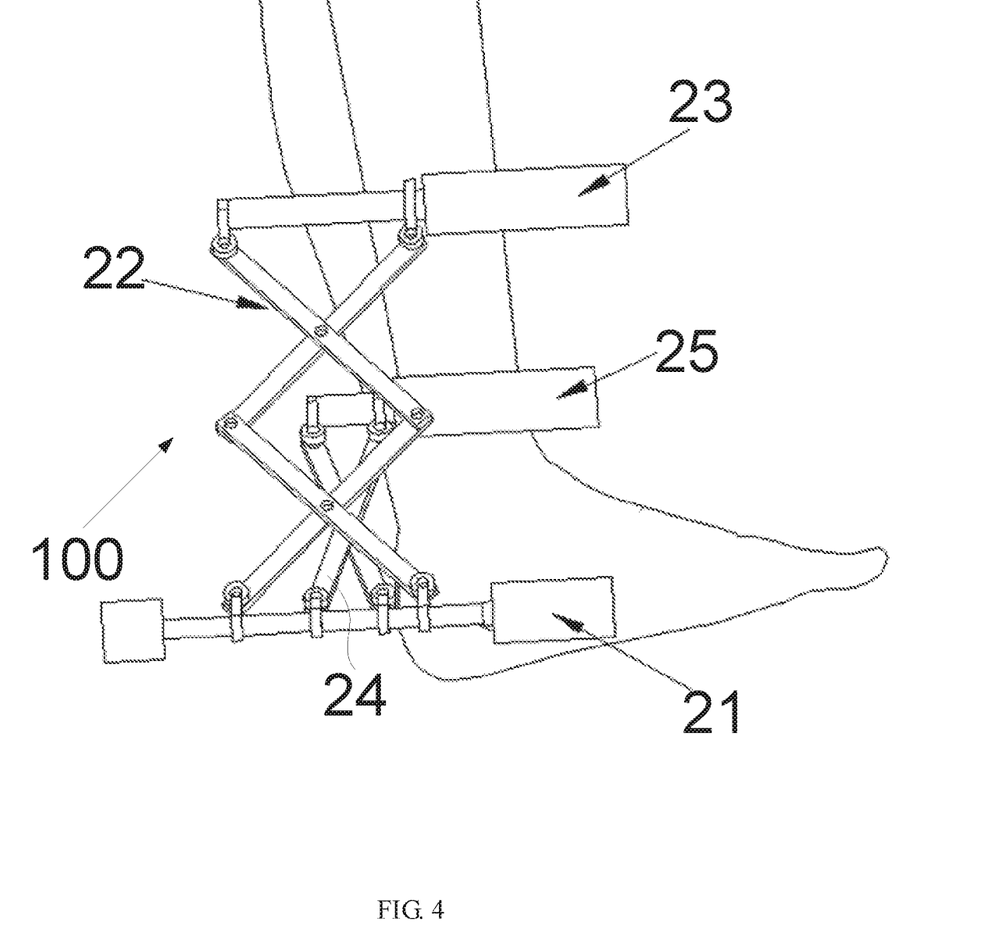
FIG. 4 is a side view of the powered exoskeleton shown in FIG. 3 when the powered exoskeleton is unfolded.

Specifically, the stabilizing structure 2 may be switched between a folded state (as shown in FIG. 1 and FIG. 3) and an unfolded state (as shown in FIG. 2 and FIG. 4). When the stabilizing structure 2 is folded, the stabilizing structure 2 is folded on the leg connection rod 1. When the stabilizing structure 2 is unfolded, the stabilizing structure 2 is suitable for being in contact with the ground and supports the leg connection rod 1 in a tilted upward direction. Thus, when the stabilizing structure 2 is needed to stabilize the powered exoskeleton 100, the stabilizing structure 2 is unfolded and is supported on the ground.

It should be noted that, one of skilled in the art will understand that the term "ground" herein does not only refer to geographic ground, and it should be understood broadly as a supporting platform. For example, when the powered exoskeleton 100 is used in an aircraft or a platform or the like, the ground refers to the aircraft or platform, or the like.

According to the powered exoskeleton 100 of one embodiment of the present disclosure, when it is necessary to stabilize the powered exoskeleton 100, the stabilizing structure 2 is unfolded, thereby stabilizing the powered exoskeleton 100 by means of the stabilizing structure 2.

In addition, the situation that "it is necessary to stabilize the powered exoskeleton 100" as stated in the present disclosure may include, but not limited to, that the powered exoskeleton 100 will be unstable. The stabilizing structure 2 may also be used for other purpose. For example, in the process of utilization of the powered exoskeleton 100, if it is needed to support larger weight, the stabilizing structure 2 can be used to stabilize the powered exoskeleton 100 as well as the human body.

The presence of the stabilizing structure 2 on the leg connection rod 1 of the powered exoskeleton 100 can facilitate for stabilizing the powered exoskeleton 100, thereby reducing or avoiding the situation of instability. Further, the stabilizing structure 2 can further increase functions of the powered exoskeleton 100.

The powered exoskeleton and the stabilizing structure of embodiments of the present disclosure are further described hereinafter in conjunction with the drawings.

As shown in FIG. 1, in one embodiment of the present disclosure, the stabilizing structure 2 includes a contact member 21 and a first supporting rod 22.

The contact member 21 is used to contact the ground, and the first supporting rod 22 is connected with the contact member 21. In the process of utilization of the stabilizing structure 2, the contact member 21 is in contact with the ground, and the contact member 21 can be used as a supporting structure to support the powered exoskeleton 100.

Further, the first supporting rod 22 is connected with the leg connection rod 1 of the powered exoskeleton 100.

Specifically, when the stabilizing structure 2 is applied to the powered exoskeleton 100, one end of the first supporting rod 22 is connected with the leg connection rod 1, and the other end of the first supporting rod 22 is connected with the contact member 21. Further, when the stabilizing structure 2 is in an unfolded state, the contact member 21 is suitable for contacting the ground.

In addition, the stabilizing structure 2 further includes a first driving member 23. The first driving member 23 may be disposed on the leg connection rod 1, and is connected with the first supporting rod 22. The first driving member 23 may drive the first supporting rod 22 to move, i.e., rotate, thereby folding or unfolding the contact member 21 by means of the first supporting rod 22.

Of course, the contact member 21 is used to facilitate contact with the ground, and an end portion of the first supporting rod 22 may be regarded as the contact member 21.

Further, as shown in FIG. 1 and FIG. 3, when the stabilizing structure 2 is in a folded state, the contact member 21 may be raised up. In other words, when the stabilizing structure 2 is in the folded state, the contact member 21 is not in contact with the ground. This can facilitate utilization of the powered exoskeleton 100, and prevent the contact member 21 from contacting the ground.

Figure 6:
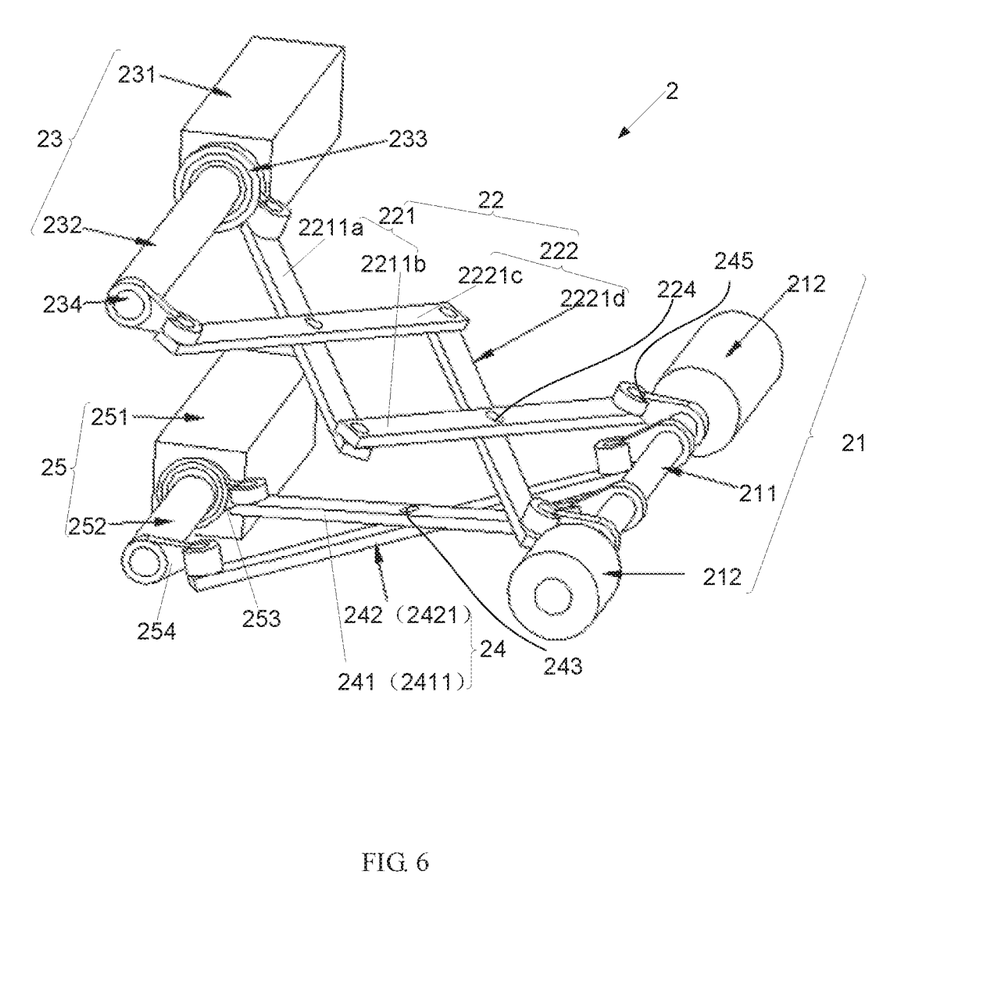
FIG. 6 is a schematic view of a stabilizing structure of a powered exoskeleton according to an embodiment of the present disclosure.

As shown in FIG. 3, FIG. 4 and FIG. 6, in one embodiment, the first supporting rod 22 may be a retractable rod. Positions of the contact member 21 can be adjusted by elongation or retraction of the first supporting rod 22.

For example, the first supporting rod 22 may be connected to a lower portion of the leg connection rod 1. When the stabilizing structure 2 is unfolded, the first supporting rod 22 elongates until the contact member 21 is in contact with the ground. An elongation direction of the first supporting rod 22 may be parallel to a horizontal direction or a downward sloping direction.

As shown in FIG. 1 to FIG. 4, in one embodiment, the first supporting rod 22 is rotatablely connected with the leg connection rod 1. Rotation of the first supporting rod 22 drives the contact member 21 to move, so that the contact member 21 can contact with the ground in a timely time, thereby supporting the powered exoskeleton 100.

In addition, the driving member can drive the first supporting rod 22 to rotate, and rotation of the first supporting rod 22 can raise or put down the contact member 21, thereby facilitating folding or supporting.

Of course, the first supporting rod 22 may be driven by other structures.

For example, as shown in FIG. 6, the stabilizing structure 2 of the present disclosure may further include a second supporting rod 24. The second supporting rod 24 is connected with the contact member 21, so that the first supporting rod 22 and the second supporting rod 24 work together to drive the contact member 21 to move. In other words, the first supporting rod 22 and the second supporting rod 24 work together to drive the contact member 21 to be fold or be in contact with the ground.

Optionally, at least one of the first supporting rod 22 and the second supporting rod 24 is a retractable rod. For example, the first supporting rod 22 may be a retractable rod, and the second supporting rod 24 may be a rod of a fixed length; or, the first supporting rod 22 may be a rod of a fixed length, and the second supporting rod 24 may be a retractable rod; or, each of the first supporting rod 22 and the second supporting rod 24 is a retractable rod.

As shown in FIG. 1 to FIG. 4, in the powered exoskeleton 100 with the stabilizing structure 2, one end of the first supporting rod 22 may be rotatablely connected with the leg connection rod 1, and an end of the second supporting rod 24 may be rotatablely connected with the leg connection rod 1; the other end of the first supporting rod 22 may be rotatablely connected with the contact member 21, and the other end of the second supporting rod 24 may be rotatablely connected with the contact member 21. A portion where the second supporting rod 24 is connected with the leg connection rod 1 is spaced from a portion where the first supporting rod 22 is connected with the leg connection rod 1. At least one of the first supporting rod 22 and the second supporting rod 24 is a retractable rod.

Thus, in one embodiment, both of the first supporting rod 22 and the second supporting rod 24 are connected with the contact member 21, and both of the first supporting rod 22 and the second supporting rod 24 are rotatablely connected with the leg connection rod 1. The first supporting rod 22 and the second supporting rod 24 may be arranged in the following manners.

According to a first manner, the first supporting rod 22 is a retractable rod and the second supporting rod 24 is a rod of a fixed length; in the process of elongation or retraction of the first supporting rod 22, the first supporting rod 22 drives the contact member 21 to rotate about the second supporting rod 24; when the first supporting rod 22 elongates to a predetermined length, the contact member 21 rotates about the second supporting rod 24 and is rotated to a stable position and contacts the ground.

According to a second manner, the first supporting rod 22 is a rod of a fixed length, and the second supporting rod 24 is a retractable rod; in the process of elongation or retraction of the second supporting rod 24, the second supporting rod 24 drives the contact member 21 to rotate about the first supporting rod 22; when the second supporting rod 24 elongates to a predetermined length, the contact member 21 rotates about the first supporting rod 22 and is also rotated to a stable position and contacts the ground.

According to a third manner, each of the first supporting rod 22 and the second supporting rod 24 is a retractable rod; the contact member 21 is driven to move by different elongation-retraction amounts of the first supporting rod 22 and the second supporting rod 24, thereby folding or unfolding the contact member 21.

According to a fourth manner, each of the first supporting rod 22 and the second supporting rod 24 is a retractable rod; an elongation-retraction of the second supporting rod 24 is used to adjust a rotation range of the contact member 21. In other words, referring to the above first manner, in the process of elongation or retraction of the first supporting rod 22, the first supporting rod 22 drives the contact member 21 to rotate about the second supporting rod 24; when the first supporting rod 22 elongates to a predetermined length, the contact member 21 rotates about the second supporting rod 24 and is rotated to a stable position and contacts the ground. Meanwhile, by means of the elongation-retraction of the second supporting rod 24, the rotation range of the contact member 21 can be adjusted.

As can be seen from the above, by the presence of the first supporting rod 22 and the second supporting rod 24, the stabilizing structure 2 of a triangular shape is defined by the first supporting rod 22 and the second supporting rod 24 as well as the leg connection rod 1. As a result, the contact member 21 can be stably supported by the ground, thereby improving stability of the powered exoskeleton 100.

Further, a first triangular structure is defined by the leg connection rod 1, the ground and the first supporting rod 22; a second triangular structure is defined by the leg connection rod 1, the ground and the second supporting rod 24; a third triangular structure is defined by the leg connection rod 1, the first supporting rod 22 and the second supporting rod 24. Since the stabilizing structure of a triangular shape is composed of several triangular structures, the supporting strength of the stabilizing structure 2 can be improved.

As shown in FIG. 2, the stabilizing structure 2 is constructed in such a manner that when the stabilizing structure 2 is in the unfolded state, an end of the first supporting rod 22 where the first supporting rod 22 is connected with the contact member 21 and an end of the second supporting rod 24 where the second supporting rod 24 is connected with the contact member 21 are oriented downwardly. As shown in FIG. 1, the stabilizing structure 2 is constructed in such a manner that when the stabilizing structure 2 is in the folded state, the end of the first supporting rod 22 where the first supporting rod 22 is connected with the contact member 21 and the end of the second supporting rod 24 where the second supporting rod 24 is connected with the contact member 21 are oriented upwardly. Such an arrangement facilitates folding and unfolding the stabilizing structure 2, and prevents the stabilizing structure 2 from affecting the human's walking.

Of course, the states of the first supporting rod 22 and the second supporting rod 24 when the stabilizing structure 2 is in different states, are not specifically limited. When the stabilizing structure 2 is in different states, the first supporting rod 22 and the second supporting rod 24 may be in other states. For example, when the stabilizing structure 2 is in the unfolded state, the end of the first supporting rod 22 where the first supporting rod 22 is connected with the contact member 21 and the end of the second supporting rod 24 where the second supporting rod 24 is connected with the contact member 21 are oriented downwardly; while when the stabilizing structure 2 is in the folded state, the end of the first supporting rod 22 where the first supporting rod 22 is connected with the contact member 21 is oriented downwardly and the end of the second supporting rod 24 where the second supporting rod 24 is connected with the contact member 21 are oriented upwardly.

Further, optionally, a position where the second supporting rod 24 is connected with the leg connection rod 1 is lower than a position where the first supporting rod 22 is connected with the leg connection rod 1.

For the above retractable rod, each retractable rod may be connected with one driving member, and the driving member is used to drive the retractable rod to elongate or retract.

As shown in FIG. 6, the retractable rod includes a primary rod group and a secondary rod group. The primary rod group includes one primary connection rod or several primary connection rods which are sequentially connected in a hinged manner. The secondary rod group includes one secondary connection rod or several secondary connection rods which are sequentially connected in a hinged manner. The number of the primary connection rods is equal to the number of the secondary connection rods. Each primary connection rod and one corresponding secondary connection rod cross and are hinged to each other through a pivot pin. An end of the primary rod group is rotatablely connected with the driving member, and the other end of the primary rod group is rotatablely connected with the contact member 21. An end of the secondary rod group is rotatablely connected with the driving member, and the other end of the secondary rod group is rotatablely connected with the contact member. Such an arrangement can improve a structure strength of the retractable rod.

Further, as shown in FIG. 6, the driving member includes a main portion and a retractable shaft. The retractable shaft is disposed in the main portion and may elongate or retract with respect to the main portion. One end of the primary rod group is rotatablely connected with the main portion, and a position of the end of the primary rod group with respect to the main portion in an axial direction of the retractable shaft is fixed. One end of the secondary rod group is rotatablely connected with the retractable shaft, and a position of the end of the secondary rod group with respect to the retractable shaft in the axial direction of the retractable shaft is fixed. In this way, an elongation or retraction of the driving member can drive the retractable rod to elongate or retract.

As can be seen from the above description, in the process of elongation and retraction of the driving member, a distance between the end of the primary rod group where the primary rod group is connected with the main portion and the end of the secondary rod group where the secondary rod group is connected with the retractable shaft, is changed, thereby realizing elongation and retraction of the retractable rod. In addition, since several polygonal stabilizing structures are formed between the primary rod group and the secondary rod group, the supporting strength of the supporting rod is improved.

Optionally, in order to control the elongation and retraction of the retractable rod, the primary connection rod may be pivotably connected with the secondary connection rod. In other words, the elongation and retraction of the retractable rod is performed in a two dimensional plane.

The main portion is connected with a primary connection member which is able to rotate around an axis of the retractable shaft. One end of the primary rod group is hinged to the primary connection member; and a rotation axis around which the one end of the primary rod group rotates relative to the primary connection member, is perpendicular to the axis of the retractable shaft. A free end of the retractable shaft is connected with a secondary connection member which is able to rotate around the axis of the retractable shaft. One end of the secondary rod group is hinged to the secondary connection member; and a rotation axis around which the one end of the secondary rod group rotates relative to the secondary connection member, is perpendicular to the axis of the retractable shaft. The presence of the primary connection member and the secondary connection member can facilitate pivotably connecting the retractable rod to the driving member, thereby improving assembly efficiency and stability of the stabilizing structure.

Further, the driving member may be a cylinder. When the driving member adopts the cylinder, it can increase speed and stability of elongation and retraction of the retractable rod. In addition, a pneumatic component has a good cushioning performance, damping effect can also be provided.

The retractable first supporting rod 22 of the stabilizing structure 2 as well as an elongation-retraction manner of the retractable first supporting rod 22 according to one embodiment of the present disclosure are described hereinafter in conjunction with the drawings.

As shown in FIG. 6, the first supporting rod 22 includes a first primary rod group 221 and a first secondary rod group 222. The first primary rod group 221 includes one first primary connection rod 2211 or several first primary connection rods 2211 which are sequentially connected in a hinged manner. The first secondary rod group 222 includes one first secondary connection rod 2221 or several first secondary connection rods 2221 which are sequentially connected in a hinged manner. The number of the first primary connection rods 2211 is equal to the number of the first secondary connection rods 2221. Each first primary connection rod 2211 and one corresponding first secondary connection rod 2221 cross and are hinged to each other through a pivot pin 224. An end of the first primary rod group 221 is rotatablely connected with the driving member 23, and the other end of the first primary rod group 221 is rotatablely connected with the contact member 21. An end of the first secondary rod group 222 is rotatablely connected with the driving member 23, and the other end of the first secondary rod group 222 is rotatablely connected with the contact member 21. Such an arrangement can improve a structure strength of the first supporting rod 22.

Further, as shown in FIG. 6, the first driving member 23 includes a first main portion 231 and a first retractable shaft 232. The first retractable shaft 232 is disposed in the first main portion 231 and may elongate or retract with respect to the first main portion 231. One end of the first primary rod group 221 is rotatablely connected with the first main portion 231, and a position of the end of the first primary rod group 221 with respect to the first main portion 231 in an axial direction of the first retractable shaft 232 is fixed. One end of the first secondary rod group 222 is rotatablely connected with the first retractable shaft 232, and a position of the end of the first secondary rod group 222 with respect to the first retractable shaft 232 in the axial direction of the first retractable shaft 232 is fixed. In this way, an elongation or retraction of the first driving member 23 can drive the first supporting rod 22 to elongate or retract.

In an example shown in FIG. 6, the first primary rod group 221 includes two first primary connection rods 2211 and the first secondary rod group 222 includes two first secondary connection rods 2221. For convenience description, the two first primary connection rods 2211 are also referred as first primary connection rods 2211a and 2211b, and the two first secondary connection rods 2221 are also referred as first secondary connection rods 2221c and 221d.

An end of the first primary connection rod 2211a is hinged to an end of the first primary connection rod 2211b. The other end of the first primary connection rod 2211a is constructed as an end of the first primary rod group 221 and is rotatablely connected with the first main portion 231 of the first driving member 23. The other end of the first primary connection rod 2211b is constructed as the other end of the first primary rod group 221 and is connected with the contact member 21.

An end of the first secondary connection rod 2221c is hinged to an end of the first secondary connection rod 2221d. The other end of the first secondary connection rod 2221c is constructed as an end of the first secondary rod group 222, and is rotatablely connected with the first retractable shaft 232 of the first driving member 23. The other end of the first secondary connection rod 2221d is constructed as the other end of the first secondary rod group 222 and is connected with the contact member 21.

Further, a middle portion of the first primary connection rod 2211a is hinged to a middle portion of the first secondary connection rod 2221c via a pivot pin 224. A middle portion of the first primary connection rod 2211b is hinged to a middle portion of the first secondary connection rod 2221d via a pivot pin 224.

Of course, the above just takes an example in which the first primary rod group 221 includes two first primary connection rods 2211 and the first secondary rod group 222 includes two first secondary connection rods 2221 for description, and is not intended to limit the scope of the present disclosure. For example, in one embodiment, the first primary rod group 221 may include one, three, four or more first primary connection rods 2211. Similarly, the first secondary rod group 222 may include one, three, four or more first secondary connection rods 2221.

As can be seen from the above description, in the process of elongation and retraction of the first driving member 23, a distance between the end of the first primary rod group 221 where the first primary rod group 221 is connected with the first main portion 231 and the end of the first secondary rod group 222 where the first secondary rod group 222 is connected with the first retractable shaft 232, is changed, thereby realizing elongation and retraction of the first supporting rod 22. In addition, since several polygonal stabilizing structures formed between the first primary rod group 221 and the first secondary rod group 222, the supporting strength of the first supporting rod 22 is improved.

Optionally, in order to control the elongation and retraction of the first supporting rod 22, the first primary connection rod 2211 may be pivotably connected with the first secondary connection rod 2221 in such a manner that the first primary connection rod 2211 may rotate about an axis of the pivot pin 224. In other words, the elongation and retraction of the first supporting rod 22 is performed in a two dimensional plane.

The first main portion 231 is connected with a first primary connection member 233 which is able to rotate around an axis of the first retractable shaft 232. One end of the first primary rod group 221 is hinged to the first primary connection member 233; and a rotation axis around which the one end of the first primary rod group 221 rotates relative to the first primary connection member 233, is perpendicular to the axis of the first retractable shaft 232. A free end of the first retractable shaft 232 is connected with a first secondary connection member 234 which is able to rotate around the axis of the first retractable shaft 232. One end of the first secondary rod group 222 is hinged to the first secondary connection member 234; and a rotation axis around which the one end of the first secondary rod group 222 rotates relative to the first secondary connection member 234, is perpendicular to the axis of the first retractable shaft 232. The presence of the first primary connection member 233 and the first secondary connection member 234 can facilitate pivotably connecting the first supporting rod 22 to the first driving member 23, thereby improving assembly efficiency and stability of the stabilizing structure 2.

Further, the first driving member 23 may be a cylinder. When the first driving member 23 adopts the cylinder, it can increase speed and stability of elongation and retraction of the first supporting rod 22. In addition, a pneumatic component has a good cushioning performance, damping effect can also be provided.

The second supporting rod 24 of the stabilizing structure 2 as well as a driving of the second supporting rod 24 according to one embodiment of the present disclosure are described hereinafter in conjunction with the drawings.

In one embodiment of the present disclosure, the second supporting rod 24 may be a retractable, and then the stabilizing structure 2 further includes a second driving member 25. The second driving member 25 is connected with the second supporting rod 24, and is used to drive the second supporting rod 24 to elongate or retract.

Further, the second supporting rod 24 includes a second primary rod group 241 and a second secondary rod group 242. The second primary rod group 241 includes one second primary connection rod 2411 or several second primary connection rods 2411 which are sequentially connected in a hinged manner. The second secondary rod group 242 includes one second secondary connection rod 2421 or several second secondary connection rods 2421 which are sequentially connected in a hinged manner. The number of the second primary connection rods 2411 is equal to the number of the second secondary connection rods 2421. Each second primary connection rod 2411 and one corresponding second secondary connection rod 2421 cross and are hinged to each other through a pivot pin 243. An end of the second primary rod group 241 is rotatablely connected with the second driving member 25, and the other end of the second primary rod group 241 is rotatablely connected with the contact member 21. An end of second secondary rod group 242 is rotatablely connected with the second driving member 25, and the other end of the second secondary rod group 242 is rotatablely connected with the contact member 21. Such an arrangement can improve structure strength of the second supporting rod 24.

As shown in FIG. 6, the second driving member 25 includes a second main portion 251 and a second retractable shaft 252. The second retractable shaft 252 is disposed in the second main portion 251 and may elongate or retract with respect to the second main portion 251. One end of the second primary rod group 241 is rotatablely connected with the second main portion 251, and a position of the end of the second primary rod group 241 with respect to the second main portion 251 in an axial direction of the second retractable shaft 252 is fixed. One end of the second secondary rod group 242 is rotatablely connected with the second retractable shaft 252, and a position of the end of the second secondary rod group 242 with respect to the second retractable shaft 252 in the axial direction of the second retractable shaft 252 is fixed. In this way, an elongation or retraction of the second driving member 25 can drive the second supporting rod 24 to elongate or retract.

In an example shown in FIG. 6, the second primary rod group 241 includes one second primary connection rod 2411 and the second secondary rod group 242 includes one second secondary connection rod 2421.

An end of the second primary connection rod 2411 is rotatablely connected with the second main portion 251 of the second driving member 25. The other end of the second primary connection rod 2411 is connected with the contact member 21.

An end of the second secondary connection rod 2421 is rotatablely connected with the second retractable shaft 252 of the second driving member 25. The other end of the second secondary connection rod 2421 is connected with the contact member 21.

In addition, a middle portion of the second primary connection rod 2411 is hinged to a middle portion of the second secondary connection rod 2421 via a pivot pin 243.

Of course, the above just takes an example in which the second primary rod group 241 includes one second primary connection rod 2411 and the second secondary rod group 242 includes one second secondary connection rod 2421 for description, and is not intended to limit the scope of the present disclosure. For example, in one embodiment, the second primary rod group 241 may include one, three, four or more second primary connection rods 2411. Similarly, the second secondary rod group 242 may include one, three, four or more second secondary connection rods 2421.

As can be seen from the above description, in the process of elongation and retraction of the second driving member 25, a distance between the end of the second primary rod group 241 where the second primary rod group 241 is connected with the second main portion 251 and the end of the second secondary rod group 242 where the second secondary rod group 242 is connected with the second retractable shaft 252, is changed, thereby realizing elongation and retraction of the second supporting rod 24. In addition, since several polygonal stabilizing structures formed between the second primary rod group 241 and the second secondary rod group 242, the supporting strength of the second supporting rod 24 is improved.

Optionally, in order to control the elongation and retraction of the second supporting rod 24, the second primary connection rod 2411 may be pivotably connected with the second secondary connection rod 2421 in such a manner that the second primary connection rod 2411 may rotate about an axis of the pivot pin 243. In other words, the elongation and retraction of the second supporting rod 24 is performed in a two dimensional plane.

The second main portion 251 is connected with a second primary connection member 253 which is able to rotate around an axis of the second retractable shaft 252. One end of the second primary rod group 241 is hinged to the second primary connection member 253; and a rotation axis around which the one end of the second primary rod group 241 rotates relative to the second primary connection member 253, is perpendicular to the axis of the second retractable shaft 252. A free end of the second retractable shaft 252 is connected with a second secondary connection member 254 which is able to rotate around the axis of the second retractable shaft 252. One end of the second secondary rod group 242 is hinged to the second secondary connection member 254; and a rotation axis around which the one end of the second secondary rod group 242 rotates relative to the second secondary connection member 254, is perpendicular to the axis of the second retractable shaft 252. The presence of the second primary connection member 253 and the second secondary connection member 254 can facilitate pivotably connecting the second supporting rod 24 to the second driving member 25, thereby improving assembly efficiency and stability of the stabilizing structure 2.

Further, the second driving member 25 may be a cylinder. When the second driving member 25 adopts the shape of a cylinder, it can increase speed and stability of elongation and retraction of the second supporting rod 24. In addition, a pneumatic component has a good cushioning performance, damping effect can also be provided.

As shown in FIG. 6, in the stabilizing structure 2 of one embodiment of the present disclosure, the contact member 21 includes a connection shaft 211 and at least one wheel such as contact wheel 212 connected with the connection shaft 211. The first supporting rod 22 is connected with the connection shaft 211. Such an arrangement can enable the contact member 21 to be stably supported by the ground, thereby improving the supporting strength and stability of the stabilizing structure 2.

According to the stabilizing structure 2 of one embodiment of the present disclosure, when it is detected that the powered exoskeleton will be unstable, the stabilizing structure 2 starts to work to change a length of each retractable rod by means of a cylinder or a motor, so that the contact wheel which is previously not in contact with the ground is driven to move away from the human body towards the ground, thereby providing a supporting structure to increase stability of the whole.

In addition, one embodiment of the present disclosure further provides a stabilizing structure which may be applied to the powered exoskeleton 100. The stabilizing structure is the above stabilizing structure 2 applied to the powered exoskeleton 100.

The stabilizing structure applied to the powered exoskeleton such as a lower-limb powered exoskeleton has following advantages: when it is detected that the powered exoskeleton will be unstable, the stabilizing structure starts to work to change a length of each retractable rod by means of a cylinder or a motor, so that the contact wheel which is previously not in contact with the ground is driven to move away from the human body towards the ground, thereby providing a supporting structure to increase stability of the whole according to the triangle principle.

An implementation of the present disclosure is described in conjunction with the drawings. As shown in FIG. 1 to FIG. 4 which are front views and side views of a powered exoskeleton when the powered exoskeleton is in a working state (i.e., an unfolded state) and when the powered exoskeleton is in a non-working state (i.e., a folded state), the reference number 21 represents a contact member, the reference number 22 represents a first supporting rod, the reference number 23 represents a first driving member, the reference number 24 represents a second supporting rod, the reference number 25 represents a second driving member, the reference number 3 represents an exoskeleton knee motor, and the reference number 1 represents an exoskeleton leg connection rod. Cylinders of the first driving member 23 and the second driving member 25 are fixed to the leg connection rod.

Details of the stabilizing structure 2 are shown in FIG. 6. Referring to FIG. 6, the contact member 21 includes a connection shaft 211 and two elastic wheels such as contact wheels 212 for contact with the ground. The two contact wheels 212 are disposed at two ends of the connection shaft 211. Each of the first supporting rod 22 and the second supporting rod 24 is a retractable rod, and is pivotably connected to the connection shaft 211 through a connection portion 245, thereby enabling the entire retractable rod to be able to rotate around an axis of the connection shaft 211, or enabling one portion of the retractable rod adjacent the connection shaft 211 to be able to rotate relative to the connection portion 245 around a line perpendicular to the axis of the connection shaft 211.

The first driving member 23 (such as a cylinder) is fixed to the leg connection rod 1, and the first retractable shaft 232 is a retractable shaft of the cylinder. The second driving member 25 is a cylinder below the first driving member 23, and the second retractable shaft 252 is a retractable shaft of the lower cylinder The first supporting rod 22 is retractable, and a maximum length of the first supporting rod 22 is greater than a length of the second supporting rod 24; and the number of joints of the first supporting rod 22 is greater than the number of joints of the second supporting rod 24, so that the contact wheels are located at an upper side when the stabilizing structure 2 is folded, and the contact wheels are a lower side when the stabilizing structure 2 is unfolded. When the first retractable shaft 232 is in an elongated state, the length of the first supporting rod 22 is shortened, and then the stabilizing structure 2 is raised up and in the non-working state. When the first retractable shaft 232 is in a retracted state, the length of the first supporting rod 22 becomes longer, and then the stabilizing structure 2 is in the working state. The second driving member 25 adjusts the length of the second retractable shaft 252, thereby adjusting the length of the second supporting rod 24 and then changing a radius of movement of the stabilizing structure 2 in the elongation and retraction process. Thus, when the second driving member 25 is omitted, the radius of movement of the stabilizing structure 2 in the elongation and retraction process may be fixed, according to the triangle principle that one triangle is fixed when three sides of the triangle are fixed.

The first secondary connection member 234 is used to connect the first retractable shaft 232 to the first supporting rod 22. The first secondary connection member 234 has two degrees of freedom, and axes of the two different rotational degrees of freedom are perpendicular to each other. The first primary connection member 233 is similar to the first secondary connection member 234.

The stabilizing structure 2 can work in two modes including a long time working state and a detection working state. When the stabilizing structure 2 works in the long time working state, the stabilizing structure 2 directly extends outwardly to play a supporting role in the process of human movement. When the stabilizing structure 2 works in the detection working state, the powered exoskeleton monitors the process of human movement and the stabilizing structure starts to work when the powered exoskeleton will be unstable.

Figure 5:
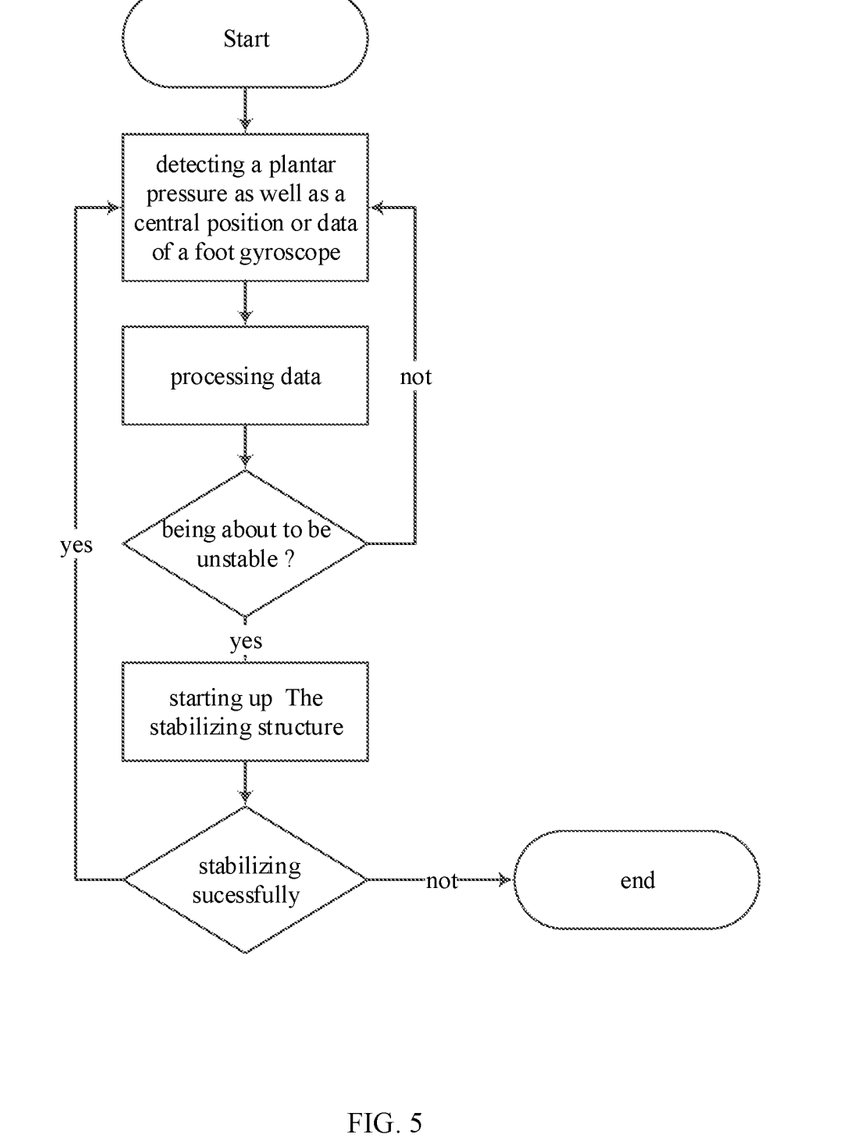
FIG. 5 is a flow chart of a process of stabilizing the powered exoskeleton according to an embodiment of the present disclosure.

According to the stabilizing structure of one embodiment of the present disclosure, as shown in FIG. 5, when the powered exoskeleton detects that the powered exoskeleton will be unstable, the stabilizing structure starts to work to change a length of each retractable rod by mean of a cylinder or a motor, so that the contact wheel which was previously not in contact with the ground is driven to move away from the human body towards the ground, thereby providing a supporting structure to increase stability of the whole.

In one embodiment of the present disclosure, as shown in FIG. 5, the powered exoskeleton can determine whether the powered exoskeleton will be unstable by detecting a plantar pressure as well as a central position or data of a foot gyroscope.

The radius of movement of the stabilizing structure in the elongation and retraction process can be adjusted by the cylinder or the motor.

The stabilizing structure can be raised up or put down.

It should be noted that, when a component is mentioned to be "connected" to another component, it may be connected directly to the other component, or there may be an intermediate component. When a component is mentioned to be "arranged on" to another component, it may be arranged directly on the other component, or there may be an intermediate component. Terms "housing" and other similar phrases used herein are for illustrated purposes only.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The above are merely the preferred embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. A powered exoskeleton, comprising:
    a leg connection rod; and
    a stabilizing structure;
    wherein the stabilizing structure is mounted on the leg connection rod; the stabilizing structure is switched between a folded state and an unfolded state in such a manner that the stabilizing structure is folded on the leg connection rod when the stabilizing structure is in the folded state, and the stabilizing structure is configured to be in contact with the ground and support the leg connection rod in a tilted upward direction when the stabilizing structure is in the unfolded state;
    wherein the stabilizing structure comprises:
        a contact member configured to be in contact with the ground when the stabilizing structure is in the unfolded state; and
        a first supporting rod with one end connected with the leg connection rod and another end connected with the contact member;
    wherein the first supporting rod is configured to drive the contact member to be in contact with or move away from the ground;
    wherein the stabilizing structure further comprises a second supporting rod; the one end of the first supporting rod is rotatablely connected with the leg connection rod, and an end of the second supporting rod is rotatablely connected with the leg connection rod; a portion where the second supporting rod is connected with the leg connection rod is spaced from a portion where the first supporting rod is connected with the leg connection rod; and another end of the second supporting rod is rotatablely connected with the contact member; at least one of the first supporting rod and the second supporting rod is a retractable rod;
    wherein the stabilizing structure is constructed in such a manner that when the stabilizing structure is in the unfolded state, the another end of the first supporting rod where the first supporting rod is connected with the contact member and the another end of the second supporting rod where the second supporting rod is connected with the contact member are oriented downwardly, and when the stabilizing structure is in the folded state, the another end of the first supporting rod where the first supporting rod is connected with the contact member and the another end of the second supporting rod where the second supporting rod is connected with the contact member are oriented upwardly.

2. The powered exoskeleton of claim 1, wherein the stabilizing structure further includes a driving member configured to drive the retractable rod to elongate or retract; and the driving member is disposed on the leg connection rod and is connected with the retractable rod.

3. The powered exoskeleton of claim 2, wherein the retractable rod includes:
    a primary rod group which includes one primary connection rod or a plurality of primary connection rods which are sequentially connected in a hinged manner; and
    a secondary rod group which includes one secondary connection rod or a plurality of secondary connection rods which are sequentially connected in a hinged manner;
    wherein the primary connection rod is corresponding to the secondary connection rod in a one-to-one manner, and each primary connection rod and the corresponding secondary connection rod cross and are hinged to each other;
    wherein one end of the primary rod group is rotatablely connected with the driving member, and another end of the primary rod group is rotatablely connected with the contact member; and one end of the secondary rod group is rotatablely connected with the driving member, and another end of the secondary rod group is rotatablely connected with the contact member.

4. The powered exoskeleton of claim 3, wherein the driving member includes:
    a main portion; and a retractable shaft which is disposed in the main portion and is configured to elongate or retract with respect to the main portion;

wherein the one end of the primary rod group is rotatablely connected with the main portion, and a position of the one end of the primary rod group with respect to the main portion in an axial direction of the retractable shaft is fixed; and the one end of the secondary rod group is rotatablely connected with the retractable shaft, and a position of the one end of the secondary rod group with respect to the retractable shaft in the axial direction of the retractable shaft is fixed.

5. The powered exoskeleton of claim 4, wherein the main portion is connected with a primary connection member which is able to rotate around an axis of the retractable shaft; the one end of the primary rod group is hinged to the primary connection member; and a rotation axis around which the one end of the primary rod group rotates relative to the primary connection member, is perpendicular to the axis of the retractable shaft; and a free end of the retractable shaft is connected with a secondary connection member which is able to rotate around the axis of the retractable shaft; the one end of the secondary rod group is hinged to the secondary connection member; and a rotation axis around which the one end of the secondary rod group rotates relative to the secondary connection member, is perpendicular to the axis of the retractable shaft.

6. The powered exoskeleton of claim 1, wherein the contact member includes a connection shaft and at least one wheel connected with the connection shaft.

7. A stabilizing structure applied to a powered exoskeleton, comprising:

a contact member suitable for being in contact with the ground; and a first supporting rod;

wherein the first supporting rod is connected with the contact member; and the first supporting rod is configured to drive the contact member to being folded or unfolded;

wherein the stabilizing structure further comprises a second supporting rod;

wherein the second supporting rod is connected with the contact member, and at least one of the first supporting rod and the second supporting rod is a retractable rod;

wherein the stabilizing structure further comprises a driving member, the driving member is connected with the retractable rod and is configured to drive the retractable rod to elongate or retract;

wherein the retractable rod comprises:

a primary rod group which comprises one primary connection rod or a plurality of primary connection rods which are sequentially connected in a hinged manner; and a secondary rod group which comprises one secondary connection rod or a plurality of secondary connection rods which are sequentially connected in a hinged manner;

wherein the primary connection rod is corresponding to the secondary connection rod in a one-to-one manner, each primary connection rod and the corresponding secondary connection rod cross and are hinged to each other;

wherein one end of the primary rod group is rotatablely connected with the driving member, and another end of the primary rod group is rotatablely connected with the contact member; and one end of the secondary rod group is rotatablely connected with the driving member, and another end of the secondary rod group is rotatablely connected with the contact member.

8. The stabilizing structure of claim 7 wherein the driving member includes:

a main portion; and a retractable shaft which is disposed in the main portion and is configured to elongate or retract with respect to the main portion;

wherein the one end of the primary rod group is rotatablely connected with the main portion, and a position of the one end of the primary rod group with respect to the main portion in an axial direction of the retractable shaft is fixed; and the one end of the secondary rod group is rotatablely connected with the retractable shaft, and a position of the one end of the secondary rod group with respect to the retractable shaft in the axial direction of the retractable shaft is fixed.

9. The stabilizing structure of claim 8, wherein the main portion is connected with a primary connection member which is able to rotate around an axis of the retractable shaft; the one end of the primary rod group is hinged to the primary connection member; and a rotation axis around which the one end of the primary rod group rotates relative to the primary connection member, is perpendicular to the axis of the retractable shaft; and a free end of the retractable shaft is connected with a secondary connection member which is able to rotate around the axis of the retractable shaft; the one end of the secondary rod group is hinged to the secondary connection member; and a rotation axis around which the one end of the secondary rod group rotates relative to the secondary connection member, is perpendicular to the axis of the retractable shaft.

10. The stabilizing structure of claim 8, wherein the driving member is a cylinder.

11. The stabilizing structure of claim 7, wherein the contact member includes a connection shaft and at least one wheel connected with the connection shaft.

* * * * *